(12) United States Patent
Kamiya

(10) Patent No.: US 11,243,106 B2
(45) Date of Patent: Feb. 8, 2022

(54) PHYSICAL QUANTITY MEASUREMENT DEVICE

(71) Applicant: DENSO CORPORATION, Kariya (JP)

(72) Inventor: Shinichi Kamiya, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/072,500

(22) Filed: Oct. 16, 2020

(65) Prior Publication Data
US 2021/0041276 A1 Feb. 11, 2021

Related U.S. Application Data

(63) Continuation of application No. PCT/JP2019/014904, filed on Apr. 4, 2019.

(30) Foreign Application Priority Data

Apr. 24, 2018 (JP) ............................. JP2018-083132

(51) Int. Cl.
*G01F 1/684* (2006.01)
*G01F 15/14* (2006.01)

(52) U.S. Cl.
CPC ............ G01F 1/6842 (2013.01); G01F 15/14 (2013.01)

(58) Field of Classification Search
CPC ........ G01F 15/14; G01F 15/185; G01F 1/684; G01F 1/6842
See application file for complete search history.

(56) References Cited

U.S. PATENT DOCUMENTS

| | | | | |
|---|---|---|---|---|
| 5,211,174 | A | * | 5/1993 | Imran .................. A61N 1/0456 600/396 |
| 8,305,087 | B2 | * | 11/2012 | Egami ................ G01N 15/0656 324/464 |
| 2007/0187552 | A1 | * | 8/2007 | Tichborne .............. B64D 45/02 244/135 R |
| 2013/0061684 | A1 | * | 3/2013 | Frauenholz ............. G01F 15/00 73/861 |
| 2014/0287905 | A1 | * | 9/2014 | Tokunaga ............... C03C 3/087 501/66 |

(Continued)

FOREIGN PATENT DOCUMENTS

| JP | 5-129480 | 5/1993 |
|---|---|---|
| JP | 2009-241388 | 10/2009 |
| JP | 4553898 | 9/2010 |

*Primary Examiner* — Francis C Gray
(74) *Attorney, Agent, or Firm* — Nixon & Vanderhye P.C.

(57) ABSTRACT

A physical quantity measurement device that measures a physical quantity of a fluid includes a bypass flow channel through which a fluid flows, a physical quantity detection unit for detecting a physical quantity of the fluid in the bypass flow channel, a detection unit having a detection terminal electrically connected to the physical quantity detection unit, a housing having a flow channel forming portion having an insulating property and forming a bypass flow channel and a terminal accommodating portion having an insulating property and accommodating a detection terminal, and a ground portion connecting the flow channel forming portion to a ground. A volume resistivity of the flow channel forming portion is included in the range of $1.0 \times 10^{11}$ ($1.0 \times 10$ to the 11th power) Ωcm to $1.0 \times 10^{14}$ ($1.0 \times 10$ to the 14th power) Ωcm.

10 Claims, 10 Drawing Sheets

(56) References Cited

U.S. PATENT DOCUMENTS

| | | | |
|---|---|---|---|
| 2014/0366581 A1* | 12/2014 | Tokunaga | C03B 5/235 |
| | | | 65/135.7 |
| 2015/0187708 A1 | 7/2015 | Tashiro et al. | |
| 2016/0153819 A1* | 6/2016 | Unger | F02M 35/10386 |
| | | | 73/273 |
| 2017/0328753 A1 | 11/2017 | Briese et al. | |
| 2017/0343406 A1 | 11/2017 | Briese et al. | |
| 2017/0345776 A1 | 11/2017 | Tashiro et al. | |

* cited by examiner

PHYSICAL QUANTITY MEASUREMENT DEVICE

CROSS REFERENCE TO RELATED APPLICATIONS

This application is a continuation application of International Patent Application No. PCT/JP2019/014904 filed on Apr. 4, 2019, which designated the U.S. and based on and claims the benefits of priority of Japanese Patent Application No. 2018-083132 filed on Apr. 24, 2018. The entire disclosure of all of the above applications is incorporated herein by reference.

TECHNICAL FIELD

The present disclosure relates to a physical quantity measurement device.

BACKGROUND

A physical quantity measurement device measures a flow rate of an intake air taken into an internal combustion engine. The physical quantity measurement device has a curved passage through which the fluid passes, and a flow rate measurement element provided in the curved passage.

SUMMARY

An object of the present disclosure is to provide a physical quantity measurement device capable of suppressing deterioration in detection accuracy of the physical quantity detection unit.

In order to achieve the above object, a first aspect of the present disclosure is a physical quantity measurement device that measures a physical quantity of a fluid. The physical quantity measurement device includes a bypass flow channel through which a fluid flows, a physical quantity detection unit for detecting a physical quantity of the fluid in the bypass flow channel, a detection unit having a detection terminal electrically connected to the physical quantity detection unit, a housing having a flow channel forming portion having an insulating property and forming a bypass flow channel and a terminal accommodating portion having an insulating property and accommodating a detection terminal, and a ground portion connecting the flow channel forming portion to a ground. A volume resistivity of the flow channel forming portion is included in the range of $1.0 \times 10^{11}$ (1.0×10 to the 11th power) Ωcm to $1.0 \times 10^{14}$ (1.0×10 to the 14th power) Ωcm.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
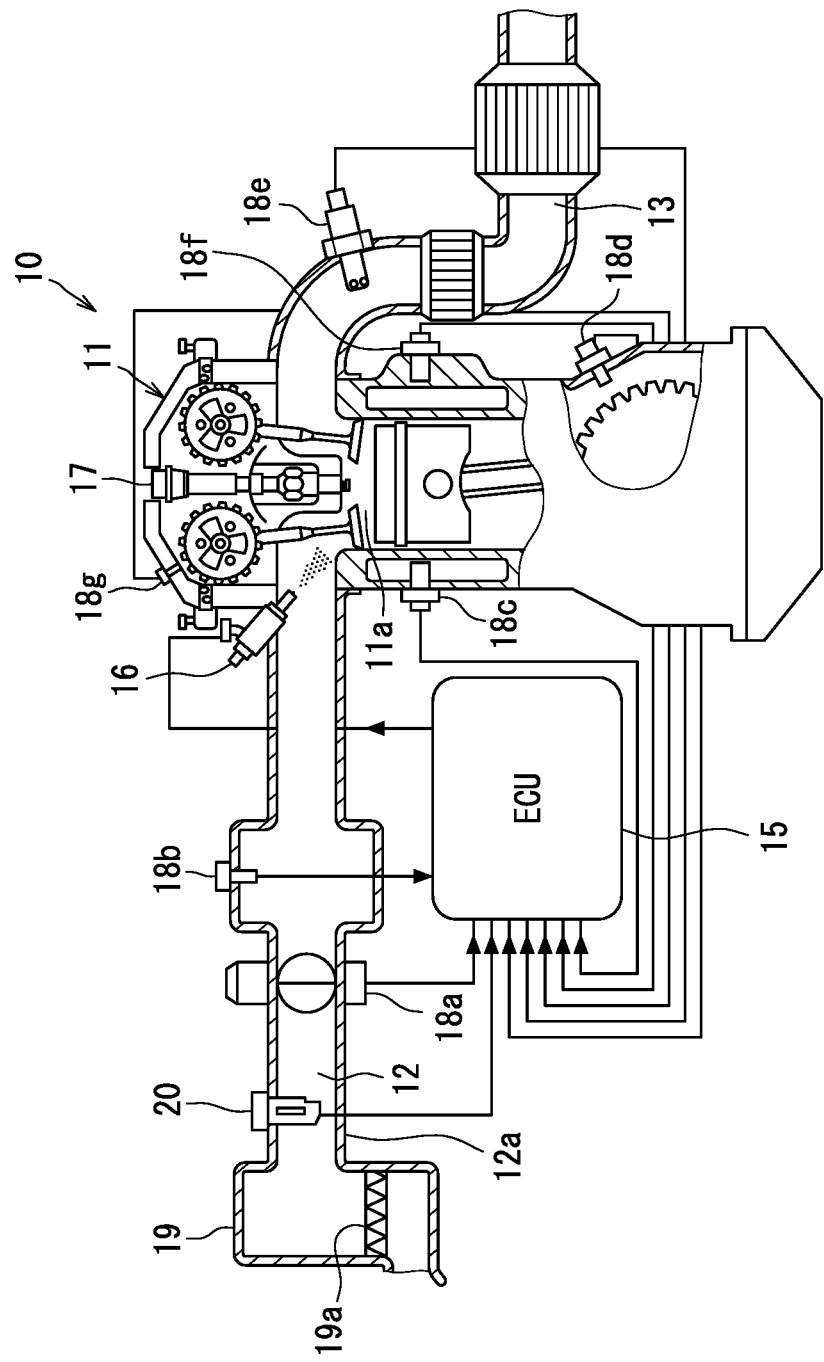
FIG. 1 is a diagram showing a configuration of a combustion system according to a first embodiment.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to the other parts of the configuration. Further, not only the combinations of the configurations explicitly shown in the description of the respective embodiments, but also the configurations of the plurality of embodiments can be partially combined even if the combinations are not explicitly shown if there is no problem in the combination in particular. Unspecified combinations of the configurations described in the plurality of embodiments and the modification examples are also disclosed in the following description.

(First Embodiment)

A combustion system 10 shown in FIG. 1 includes an internal combustion engine 11 such as a gasoline engine, an intake passage 12, an exhaust passage 13, an airflow meter 20, and an ECU 15, and the combustion system 10 is mounted on a vehicle, for example. The airflow meter 20 is provided in the intake passage 12 and measures physical quantities such as a flow rate, a temperature, a humidity, and a pressure of an intake air supplied to the internal combustion engine 11. The airflow meter 20 corresponds to a "physical quantity measurement device" that measures a fluid such as the intake air. The intake air is a gas supplied to a combustion chamber 11a of the internal combustion engine 11. In the combustion chamber 11a, a mixture of the intake air and a fuel is ignited by an ignition plug 17.

The ECU (Engine Control Unit) 15 is a controller for controlling an operation of the combustion system 10. The ECU 15 is a calculation processing circuit including a processor, a storage medium such as a RAM, a ROM and a flash memory, a microcomputer including an input and output unit, a power supply circuit, and the like. A sensor signal output from the airflow meter 20, a sensor signal output from a large number of vehicle-mounted sensors, and the like are input to the ECU 15. The ECU 15 uses measurement results of the airflow meter 20 to perform an engine control such as control of a fuel injection amount and an EGR amount of an injector 16. The ECU 15 is a controller that controls an operation of the internal combustion engine 11, and the combustion system 10 may be referred to as an engine control system. The ECU 15 corresponds to an external device.

The combustion system 10 has a plurality of measuring units as in-vehicle sensors. As the measurement units, in addition to the airflow meter 20, a throttle sensor 18a, an intake pressure sensor 18b, a water temperature sensor 18c, a crank angle sensor 18d, an air-fuel ratio sensor 18e, a knock sensor 18f, a cam angle sensor 18g, and the like are included. Each of these measurement units is electrically connected to the ECU 15 and outputs a detection signal to the ECU 15.

The combustion system 10 has an air cleaner 19 that purifies intake air. The air cleaner 19 is provided at an upstream end of the intake passage 12. The air cleaner 19 has an air filter 19a that removes foreign matter from the intake air taken into the intake passage 12. The air filter 19a has a mesh or the like that allows intake air to pass through while catching foreign matter, and is made of, for example, a synthetic resin material such as polyethylene.

Figure 2:
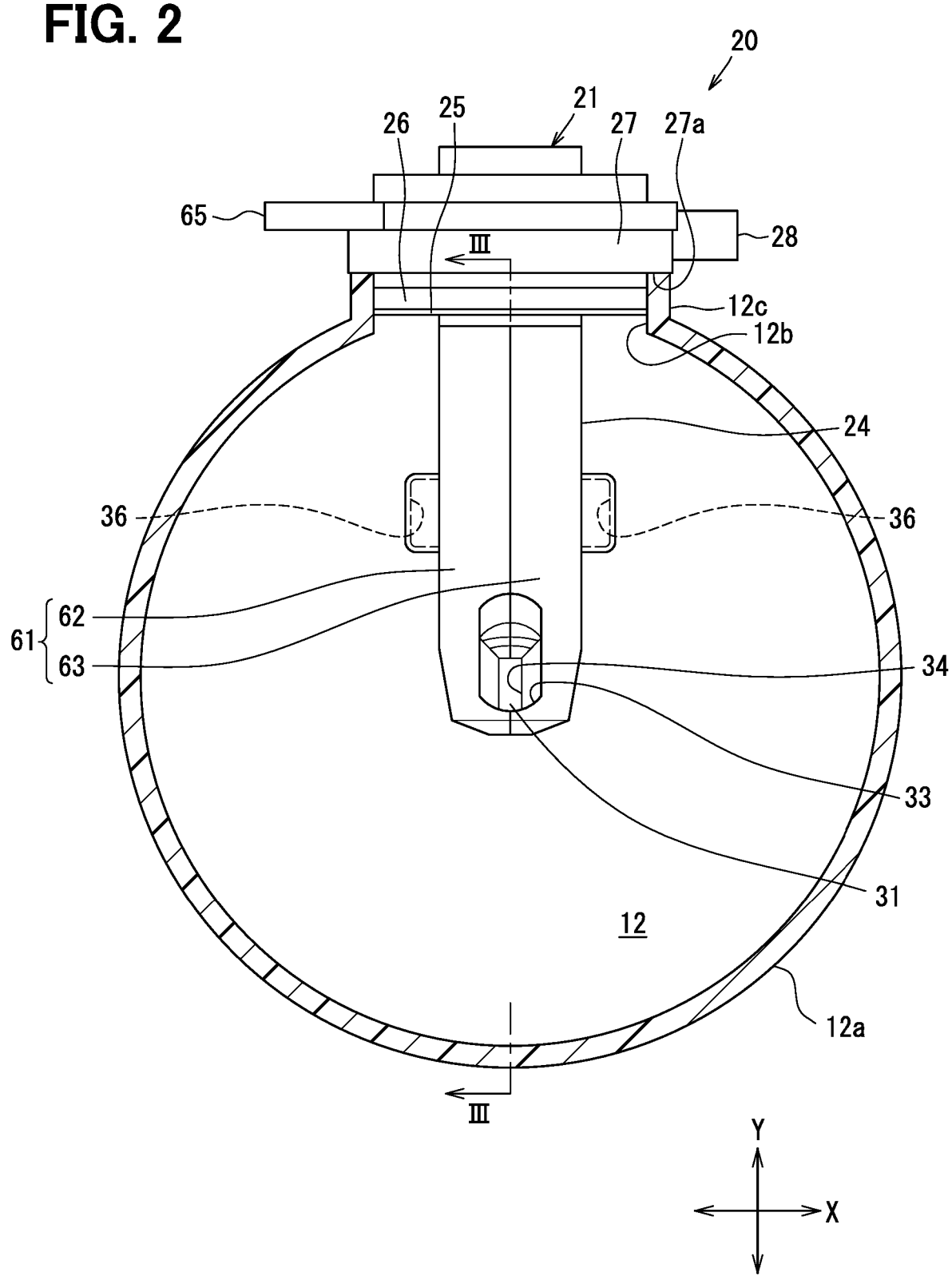
FIG. 2 is a front view of an airflow meter attached to an intake pipe.
Figure 3:
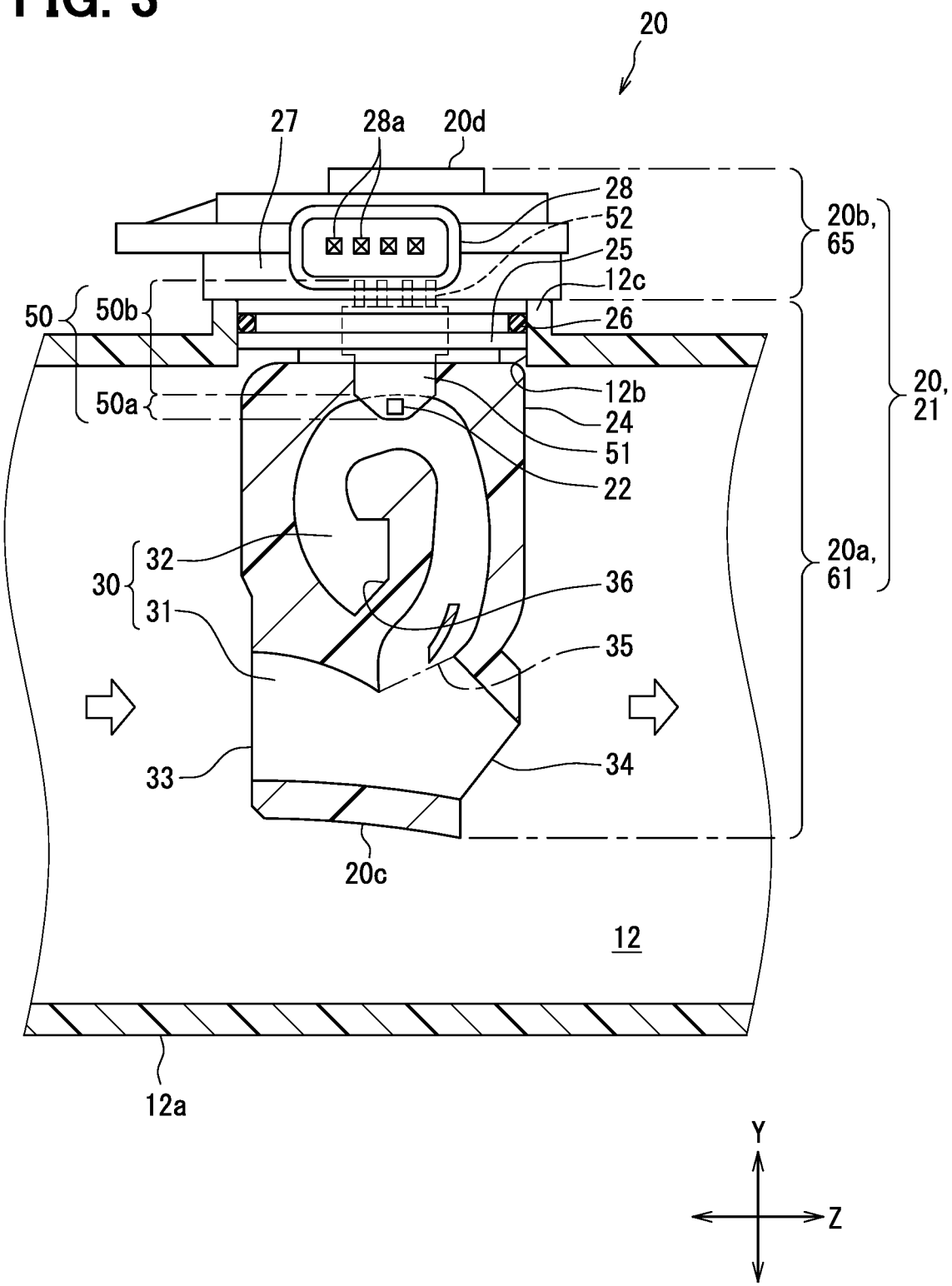
FIG. 3 is a cross-sectional view taken along a line III-III in FIG. 2.

The airflow meter 20 is provided in the intake passage 12 on a downstream side of the air cleaner 19 and on an upstream side of the throttle valve to which the throttle sensor 18a is attached. As shown in FIGS. 2 and 3, the airflow meter 20 is attached to an intake pipe 12a such as a duct forming the intake passage 12. The intake pipe 12a has an airflow meter insertion hole 12b as a through hole penetrating through an outer peripheral portion of the intake pipe 12a. The airflow meter insertion hole 12b is provided with an annular pipe flange 12c, and the pipe flange 12c is included in the intake pipe 12a. The airflow meter 20 is inserted into the pipe flange 12c and the airflow meter insertion hole 12b to enter the intake passage 12, and is fixed to the intake pipe 12a and the pipe flange 12c in this inserted state.

In the present embodiment, a width direction X, a height direction Y, and a depth direction Z are defined for the airflow meter 20, and those directions X, Y, and Z are orthogonal to each other. The airflow meter 20 extends in the height direction Y, and the intake passage 12 extends in the depth direction Z. As shown in FIG. 3, the airflow meter 20 has an entering part 20a entering the intake passage 12 and a protruding part 20b protruding outside from the pipe flange 12c without entering the intake passage 12. The entering part 20a and the protruding part 20b are aligned in the height direction Y. The airflow meter 20 has a pair of end surfaces 20c and 20d arranged in the height direction Y, one end surface included in the entering part 20a is referred to as an airflow meter tip end surface 20c, and the other end surface included in the protruding part 20b is referred to as an airflow meter base end surface 20d. The airflow meter tip end surface 20c and the airflow meter base end surface 20d are orthogonal to the height direction Y. Further, the tip end surface of the pipe flange 12c is also orthogonal to the height direction Y.

As shown in FIGS. 2 to 5, the airflow meter 20 includes a housing 21, a flow rate detection unit 22 that detects the flow rate of intake air, and an intake air temperature sensor 23 (see FIG. 4) that detects the temperature of intake air. The housing 21 is made of a resin material or the like. The housing 21 of the airflow meter 20 is attached to the intake pipe 12a such that the flow rate detection unit 22 can come in contact with the intake air flowing through the intake passage 12. The housing 21 has a housing main body 24, a ring holding portion 25, a flange portion 27, and a connector portion 28, and an O-ring 26 is attached to the ring holding portion 25.

The housing main body 24 is formed in a cylindrical shape as a whole, and in the housing 21, the ring holding portion 25, the flange portion 27, and the connector portion 28 are integrally provided in the housing main body 24. The ring holding portion 25 is included in the entering part 20a, and the flange portion 27 and the connector portion 28 are included in the protruding part 20b.

The ring holding portion 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding portion 25 and an inner peripheral surface of the pipe flange 12c. A fixing hole such as a screw hole for fixing a fixing tool such as a screw for fixing the airflow meter 20 to the intake pipe 12a is provided in the flange portion 27. The connector portion 28 is a protection portion that protects a plurality of connector terminals 28a electrically connected to the flow rate detection unit 22. A plug portion is attached to the connector portion 28. The plug portion is provided at an end of a connection line electrically connected to the ECU 15, and the plug portion is mounted on the connector portion 28 so that the ECU 15 and the flow rate detection unit 22 are electrically connected.

Figure 4:
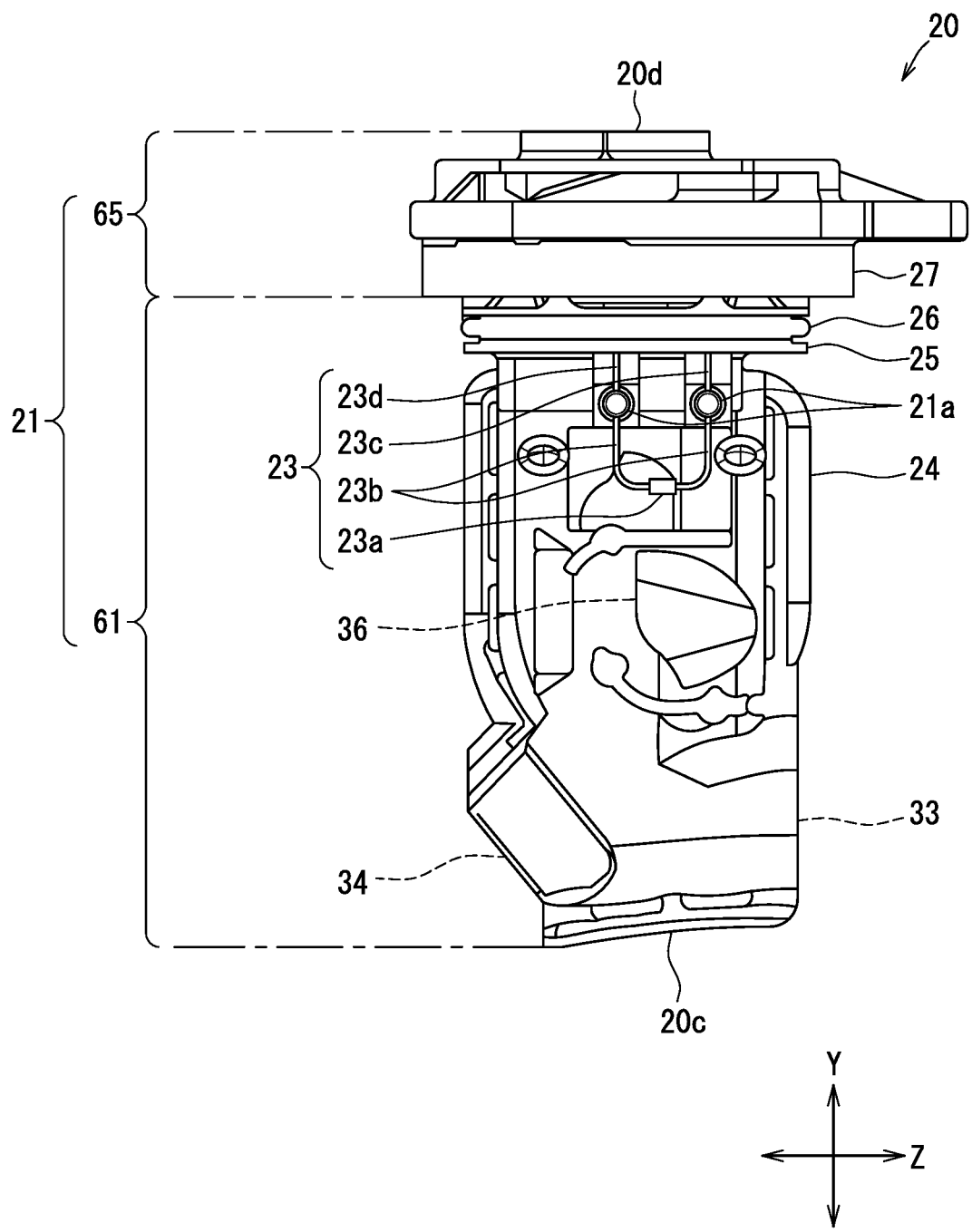
FIG. 4 is a front view showing a configuration of a sensor SA.

The flow rate detection unit 22 is provided inside the housing 21. On the other hand, as shown in FIG. 4, the intake air temperature sensor 23 is provided outside the housing 21. The intake air temperature sensor 23 includes a temperature sensing element 23a for sensing the temperature of intake air, a pair of lead wires 23b extending from the temperature sensing element 23a, a signal terminal 23c for sending a detection signal, and a ground terminal 23d connected to a ground GND (see FIG. 9). The temperature sensing element 23a is bridged by the pair of lead wires 23b, one of the pair of lead wires 23b is connected to the signal terminal 23c and the other is connected to the ground terminal 23d. The temperature sensing element 23a is connected to the signal terminal 23c and the ground terminal 23d via the lead wire 23b.

The signal terminal 23c and the ground terminal 23d are electrically connected to the connector terminal 28a, respectively. The plurality of connector terminals 28a include a ground terminal that is grounded to the ground GND in a state where the plug portion is mounted on the connector portion 28, and the ground terminal 23d is connected to the ground terminal so as to be grounded to the ground GND.

The housing 21 has a terminal support portion 21a that supports the signal terminal 23c and the ground terminal 23d. The terminal support portion 21a is formed by projecting an outer surface of the housing 21 toward outside. The signal terminal 23c and the ground terminal 23d are supported by the terminal support portion 21a by penetrating the inside of the terminal support portion 21a. At least a part of the ground terminal 23d is exposed to the outside of the housing 21. In FIG. 2, the flow rate detection unit 22 is not shown.

Figure 5:
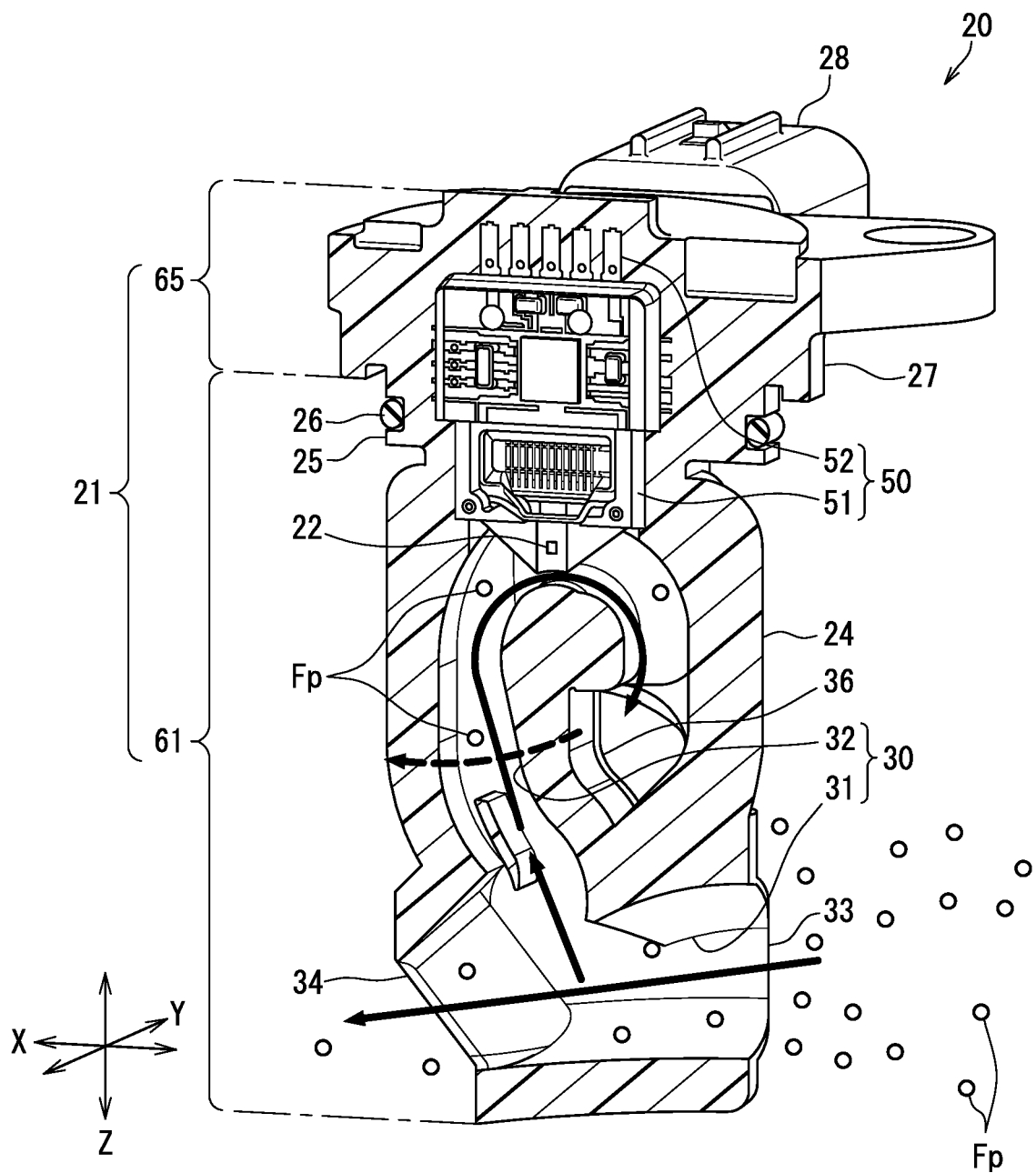
FIG. 5 is a vertical cross-sectional view showing an internal configuration of the sensor SA.

As shown in FIGS. 3 and 5, the housing 21 forms a bypass flow channel 30 into which a part of the intake air flowing through the intake passage 12 flows. The bypass flow channel 30 is disposed in the entering part 20a of the airflow meter 20. The bypass flow channel 30 has a passage flow channel 31 and a measurement flow channel 32, and the passage flow channel 31 and the measurement flow channel 32 are formed in an internal space of the housing 21. The intake passage 12 may be referred to as a main passage, and the bypass flow channel 30 may be referred to as a sub passage.

The passage flow channel 31 penetrates through the housing 21 in the depth direction Z. The passage flow channel 31 has an inflow port 33 as an upstream end and an outflow port 34 as a downstream end. The measurement flow channel 32 is a branch flow channel branched from an intermediate portion of the passage flow channel 31, and the flow rate detection unit 22 is provided in the measurement flow channel 32. The measurement flow channel 32 has a measurement inlet 35 which is an upstream end of the measurement flow channel 32 and a measurement outlet 36 which is a downstream end of the measurement flow channel 32. A portion where the measurement flow channel 32 branches from the passage flow channel 31 is a boundary between the passage flow channel 31 and the measurement flow channel 32, and the measurement inlet 35 is included in the boundary. The measurement inlet 35 corresponds to a branch inlet, and the measurement outlet 36 corresponds to a branch outlet. The boundary between the passage flow channel 31 and the measurement flow channel 32 may also be referred to as a flow channel boundary.

The flow rate detection unit 22 is a thermal type flow rate sensor having a heater. The flow rate detection unit 22 outputs a detection signal according to a temperature change caused by heat generation of the heater. The flow rate detection unit 22 is a rectangular parallelepiped chip component, and the flow rate detection unit 22 may also be referred to as a sensor chip. The flow rate detection unit 22 corresponds to a "physical quantity detection unit" that detects the flow rate of the intake air as a physical quantity of fluid. Further, the flow rate detection unit 22 is not limited to a thermal type flow rate sensor, and may be a movable flap type flow rate sensor, a Kalman vortex type flow rate sensor, or the like.

The airflow meter 20 has a sensor sub-assembly including the flow rate detection unit 22, and the sensor sub-assembly is referred to as a sensor SA 50. The sensor SA 50 is housed inside the housing 21 in a state where the flow rate detection unit 22 is exposed in the measurement flow channel 32. The sensor SA 50 may also be referred to as a measurement unit or a sensor package.

The sensor SA 50 has an entering part 50a entering the measurement flow channel 32, and a protruding part 50b protruding from the measurement flow channel 32 without entering the measurement flow channel 32. The entering part 50a and the protruding part 50b are aligned in the height direction Y, and the flow rate detection unit 22 is included in the entering part 50a.

The sensor SA 50 has a SA main body 51 having the flow rate detection unit 22 and a plurality of lead terminals 52 protruding from the SA main body 51. In the sensor SA 50, a detection result of the flow rate detection unit 22 is input to a processing unit such as a circuit chip, and a processing result of the processing unit is output to the ECU 15 via the lead terminals 52. The SA main body 51 has the processing unit and a mold portion that protects the processing unit and the like, and the lead terminal 52 is electrically connected to the flow rate detection unit 22 through the processing unit and the like inside the mold portion. A volume resistivity, which is a resistance per unit volume of the mold portion, is larger than $1.0 \times 10^{14}$ (1.0×10 to the 14th power) Ωcm. The lead terminals 52 are made of a conductive material such as metal having conductivity, and a plurality of lead terminals 52 project from the SA main body 51. At least one of the lead terminals 52 is connected to the ground terminal included in the connector terminals 28a together with the ground terminal 23d. The sensor SA 50 corresponds to a "detection unit", and the lead terminal 52 corresponds to a "detection terminal".

The housing 21 is formed by combining a plurality of constituent members. As shown in FIGS. 2 to 5, the housing 21 includes, as a plurality of constituent members, a flow channel forming portion 61 that is a constituent member that forms the bypass flow channel 30, and a terminal accommodating portion 65 that is a constituent member that houses the lead terminals 52. The lead terminals 52 are also insert terminals inserted in the terminal accommodating portion 65.

The flow channel forming portion 61 and the terminal accommodating portion 65 are arranged side by side in the height direction Y, and in the housing 21, most of the entering part 20a is formed by the flow channel forming portion 61 and most of the protruding part 20b is formed by the terminal accommodating portion 65. The boundary between the flow channel forming portion 61 and the terminal accommodating portion 65 extends in the direction orthogonal to the height direction Y, and substantially coincides with the boundary between the entering part 20a and the protruding part 20b. The boundary between the flow channel forming portion 61 and the terminal accommodating portion 65 may be located at a position deviated from the boundary between the entering part 20a and the protruding part 20b toward the airflow meter tip end surface 20c side or the airflow meter base end surface 20d side.

The terminal accommodating portion 65 accommodates the entire lead terminal 52. The lead terminal 52 is arranged closer to the airflow meter base end surface 20d than the boundary between the flow channel forming portion 61 and the terminal accommodating portion 65. In the housing 21, the flange portion 27 and the connector portion 28 are included in the terminal accommodating portion 65.

The flow channel forming portion 61 is formed by combining a plurality of constituent members, and as these constituent members, as shown in FIG. 2, has a first flow channel member 62 and a second flow channel member 63. The first flow channel member 62 and the second flow channel member 63 are arranged side by side in the width direction X, and the boundary between these flow channel members 62 and 63 extends in the direction orthogonal to the width direction X. Each of the first flow channel member 62 and the second flow channel member 63 is provided with a groove on the surface that is overlapped with each other, and the bypass flow channel 30 is formed by combining these grooves of the first and second flow channel members 62 and 63. The flow channel forming portion 61 includes the bypass flow channel 30 and the ring holding portion 25.

The first flow channel member 62 has a terminal support portion 21a. Therefore, the first flow channel member 62 is grounded to the ground GND via the ground terminal 23d at the terminal support portion 21a. The first flow channel member 62, the second flow channel member 63, and the terminal accommodating portion 65 are joined to each other by a resin material or the like. Therefore, the second flow channel member 63 and the terminal accommodating portion 65 are grounded to the ground GND by the ground terminal 23d via the first flow channel member 62. That is, the housing 21 is grounded to the ground GND by the ground terminal 23d. In this case, the ground terminal 23d corresponds to the "ground portion".

Figure 6:
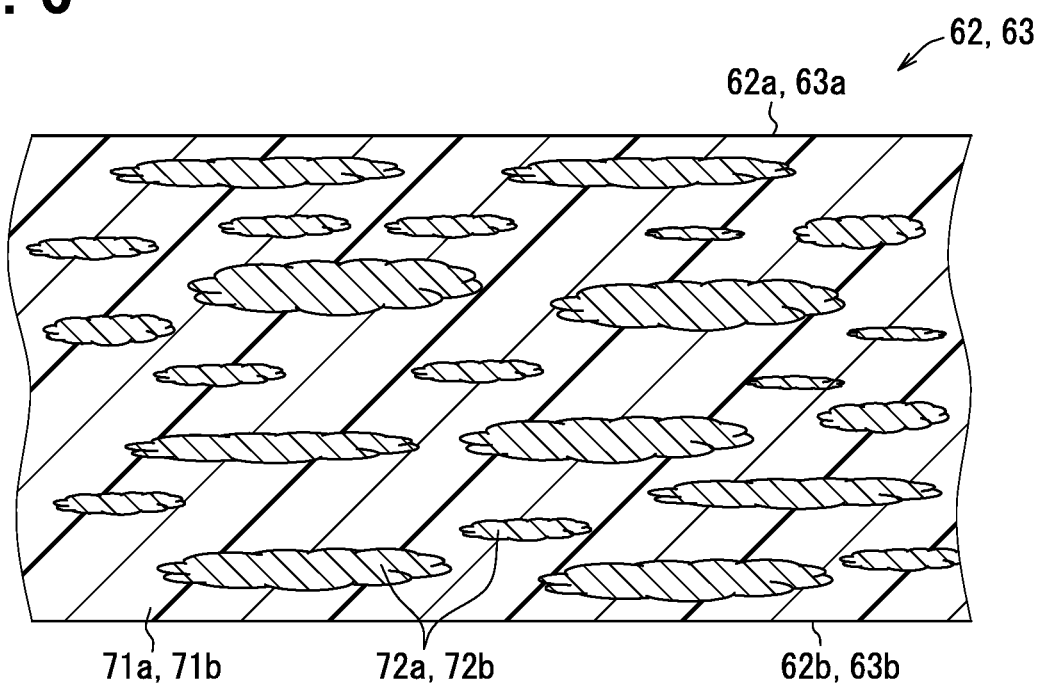
FIG. 6 is a diagram for explaining an arrangement of insulating portions and conductive portions in a first flow channel member and a second flow channel member.
Figure 7:
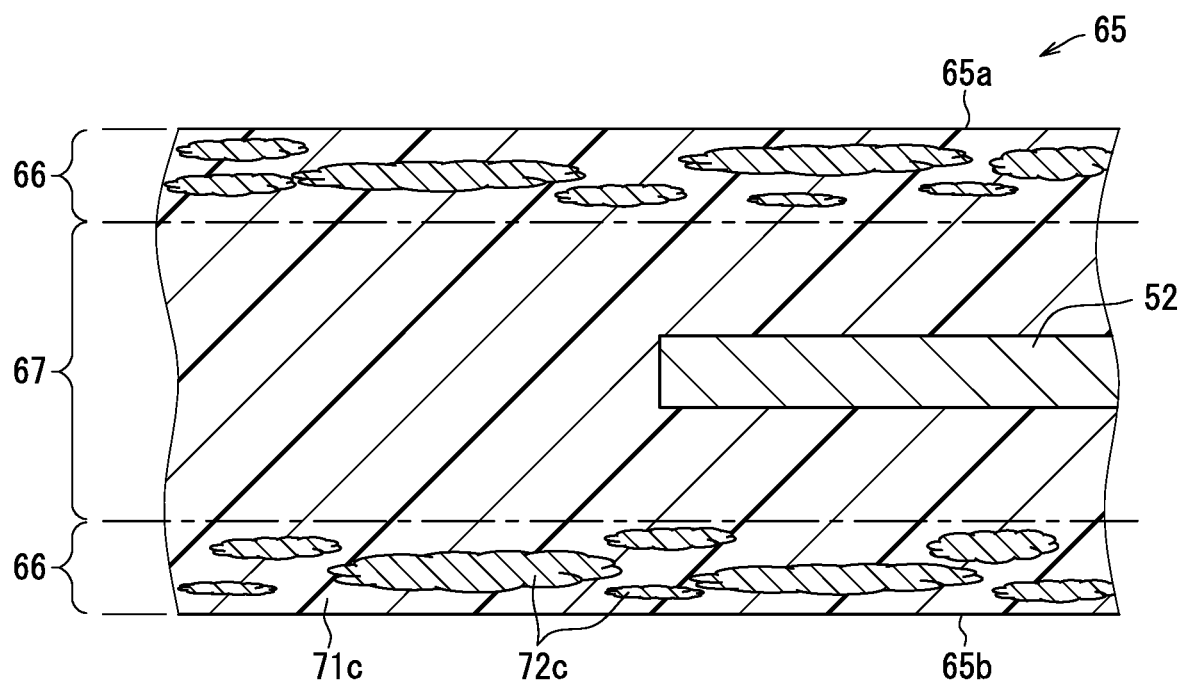
FIG. 7 is a diagram for explaining an arrangement of insulating portions and conductive portions in a terminal accommodating portion.

As shown in FIG. 6 and FIG. 7, each of the flow channel members 62, 63 and the terminal accommodating portion 65 is in a state in which a plurality of conductive portions 72a, 72b, 72c having conductivity are mixed and dispersed in insulating portions 71a, 71b, 71c having insulation properties. The insulating portions 71a to 71c are formed of a resin material as an insulating material, and examples of the resin material include thermoplastic resins such as polybutylene terephthalate resin (PBT resin) and polyphenylene sulfide resin (PPS resin). The insulating portions 71a to 71c are reversibly solidified due to the characteristics of the thermoplastic resin.

The conductive portions 72a to 72c may contain one kind of thermoplastic resin, or may contain plural kinds of thermoplastic resins.

The conductive portions 72a to 72c are formed of a carbon material as a conductive material, and examples of the carbon material include carbon powder, carbon fiber, nanocarbon, graphene, and carbon microparticles. The conductive portions 72a to 72c contain a plurality of selected from carbon powder, carbon fiber, nanocarbon, graphene and carbon microparticles. Examples of nanocarbon include carbon nanotubes, carbon nanofibers, fullerenes, and so on.

Each volume resistivity, which is the resistance per unit volume of the flow channel members 62, 63 and the terminal accommodating portion 65, is included in the range of $1.0 \times 10^{11}$ ($1.0 \times 10$ to the 11th power) Ωcm or more and $1.0 \times 10^{14}$ ($1.0 \times 10$ to the 14th power) Ωcm or less. The volume resistivity of the insulating portions 71a to 71c is greater than $1.0 \times 10^{14}$ ($1.0 \times 10$ to the 14th power) Ωcm. Since the insulating portions 71a to 71c are mixed with the plurality of conductive portions 72a to 72c, the volume resistivity of each of the flow channel members 62 and 63 and the terminal accommodating portion 65 is smaller than the volume resistivity of the insulating portions 71a to 71c. In the flow channel members 62, 63 and the terminal accommodating portion 65, the insulating material forming the insulating portions 71a to 71c is a main material, and the conductive material forming the conductive portions 72a to 72c is an additive material added to the main material.

In the flow channel members 62, 63 and the terminal accommodating portion 65, a content rate and content of the conductive portions 72a to 72c with respect to the insulating portions 71a to 71c are set so that the volume resistivity is a value included in the range of $1.0 \times 10^{11}$ ($1.0 \times 10$ to the 11th power) Ωcm to $1.0 \times 10^{14}$ ($1.0 \times 10$ to the 14th power) Ωcm. Regarding the contents of the flow channel members 62, 63 and the terminal accommodating portion 65, the insulating portions 71a to 71c are larger than the conductive portions 72a to 72c. For example, the mass of the conductive portions 72a to 72c is included in the range of 2% to 20% of the mass of the insulating portions 71a to 71c. In the present embodiment, the mass of the conductive portions 72a to 72c is set to about 12% of the mass of the insulating portions 71a to 71c.

As shown in FIG. 6, in the flow channel members 62 and 63, the conductive portions 72a and 72b are dispersed over the entire insulating portions 71a and 71b. The flow channel members 62, 63 have outer surfaces 62a, 63a included in the outer surface of the housing 21 and inner surfaces 62b, 63b forming the bypass flow channel 30. The inner surface of the housing 21 is a forming surface that forms the bypass flow channel 30, and the inner surfaces 62b and 63b of the flow channel members 62 and 63 are included in the inner surface of the housing 21. The volume resistivity of each of the flow channel members 62 and 63 is a value indicating a resistance between the outer surfaces 62a and 63a and the inner surfaces 62b and 63b. As a method for measuring the volume resistivity, there is a two-terminal method in which a current is passed between the outer surfaces 62a and 63a and the inner surfaces 62b and 63b.

As shown in FIG. 7, the terminal accommodating portion 65 has an exposed surface 65a included in the outer surface of the housing 21 and a joint surface 65b joined to the flow channel members 62 and 63. The volume resistivity of the terminal accommodating portion 65 is a value indicating a resistance between the exposed surface 65a and the joint surface 65b, and can be measured by the two-terminal method described above. The exposed surface 65a and the joint surface 65b are included in the outer surface of the terminal accommodating portion 65.

The terminal accommodating portion 65 has an outer layer 66 forming the exposed surface 65a and the joint surface 65b, and an inner layer 67 provided inside the outer layer 66. The outer layer 66 extends along the outer surface of the terminal accommodating portion 65 so as to cover the entire inner layer 67. In the terminal accommodating portion 65, the content ratio of the conductive portion 72c with respect to the insulating portion 71c in the outer layer 66 is higher than that in the inner layer 67. The inner layer 67 does not include the conductive portion 72c or slightly contains it, and the volume resistivity of the inner layer 67 is larger than that of the outer layer 66.

Also in the housing 21 formed by assembling the flow channel members 62, 63 and the terminal accommodating portion 65 with each other, the volume resistivity, which is the resistance per unit volume, is included in the range of $1.0 \times 10^{11}$ ($1.0 \times 10$ to the 11th power) Ωcm to $1.0 \times 10^{14}$ ($1.0 \times 10$ to the 14th power) Ωcm. The volume resistivity of the housing 21 is a value indicating the resistance between the outer surface 62a of the first flow channel member 62 and the exposed surface 65a of the terminal accommodating portion 65, and the resistance between the outer surface 62a of the second flow channel member 63 and the exposed surface 65a of the terminal accommodating portion 65. The volume resistivity can be measured by the two-terminal method described above. That is, the volume resistivity of the housing 21 is a value indicating the resistance between portions of the outer surface of the housing 21 that are separated from each other.

Further, also in the flow channel forming portion 61 formed by assembling the flow channel members 62 and 63 with each other, the volume resistivity which is the resistance per unit volume is included in the range of $1.0 \times 10^{11}$ ($1.0 \times 10$ to the 11th power) Ωcm to $1.0 \times 10^{14}$ ($1.0 \times 10$ to the 14th power) Ωcm. The volume resistivity of the flow channel forming portion 61 is a value indicating the resistance between the outer surface 62a of the first flow channel member 62 and the outer surface 62a of the second flow channel member 63, and is measured by the two-terminal method described above or the like. That is, the volume resistivity of the flow channel forming portion 61 is a value indicating the resistance between portions of the outer surface of the flow channel forming portion 61 that are separated from each other.

The lead terminal 52 of the sensor SA 50 is entirely housed in the inner layer 67 of the terminal accommodating portion 65 and does not project from the inner layer 67. As described above, in the terminal accommodating portion 65, the inner layer 67 hardly includes the conductive portion 72c, so that the insulating performance of the inner layer 67 is higher than that of the outer layer 66. Therefore, it is possible to prevent the lead terminal 52 from leaking in the terminal accommodating portion 65. In FIG. 7, the connector terminals 28a and the SA main body 51 are not shown.

The flow channel members 62, 63 and the terminal accommodating portion 65 are manufactured by injecting a molten resin in a state in which a conductive material is mixed with an insulating material from an injection molding machine into a mold device such as a mold. A speed of injecting the molten resin from the injection molding machine into the mold device in the case of manufacturing the flow channel members 62, 63 is slower than that in the case of manufacturing the terminal accommodating portion 65. As described above, the injection speed of the molten resin is relatively slow, so that the conductive material is easily spread over the entire flow channel members 62 and 63. In addition, since the injection speed of the molten resin in the case of manufacturing the terminal accommodating portion 65 is relatively high, the conductive material is not distributed all over the terminal accommodating portion 65. Therefore, the conductive material of the outer layer 66 is biased so as to be larger than the conductive material of the inner layer 67. The first flow channel member 62, the second flow channel member 63, and the terminal accommodating portion 65 are joined to each other by using a molten resin used for resin molding the flow channel members 62, 63 and the terminal accommodating portion 65. For this reason, the conductive portion is mixed and dispersed in the insulating portion even at these joined portions.

In the resin molding using the mold device, a skin layer is formed by cooling and solidifying the molten resin that is in contact with the surface of the mold device in the molten resin injected into the mold device, and the molten resin inside the skin layer is solidified at a later timing than the skin layer to form a core layer. In the flow channel members 62 and 63 and the terminal accommodating portion 65, the skin layer is likely to contain a large amount of conductive material. In the flow channel members 62 and 63, the skin layer and the core layer have the same content of the conductive material. On the other hand, in the terminal accommodating portion 65, the content rate of the conductive portion 72c in the skin layer is higher than that in the core layer. In the terminal accommodating portion 65, the skin layer is the outer layer 66 and the core layer is the inner layer 67.

When the foreign matter contained in the intake air is small enough to pass through the air filter 19a, the foreign matter passes through the air cleaner 19 and reaches the airflow meter 20. When the foreign matter contacts the housing 21 of the airflow meter 20, the foreign matter and the housing 21 may be charged with static electricity due to frictional charging or contact charging. When the foreign matter that is more likely to be positively charged than the housing 21 contacts the housing 21, this foreign matter becomes a positively charged positive foreign matter Fp, and a negative charge 75 is generated in the housing 21 (see FIG. 9). The negative charge 75 exists on the outer surface such as the skin layer and at a position close to the inner surface in the housing 21. Further, when the foreign matter that is likely to be positively charged has already become the positive foreign matter Fp, the positive foreign matter Fp comes into contact with the housing 21, so that the positive foreign matter Fp is further positively charged and the housing 21 is further negatively charged. Therefore, the negative charge 75 increases.

Examples of the foreign matter that tends to be positively charged include foreign matter containing glass components such as sand and dust. In the charging column showing whether each substance is easily charged positively or negatively, if the substance arranged at the position of the charging column more easily charged positively than the material forming the housing 21 is a foreign substance, the foreign matter is positively charged and the housing 21 is easily negatively charged.

Figure 8:
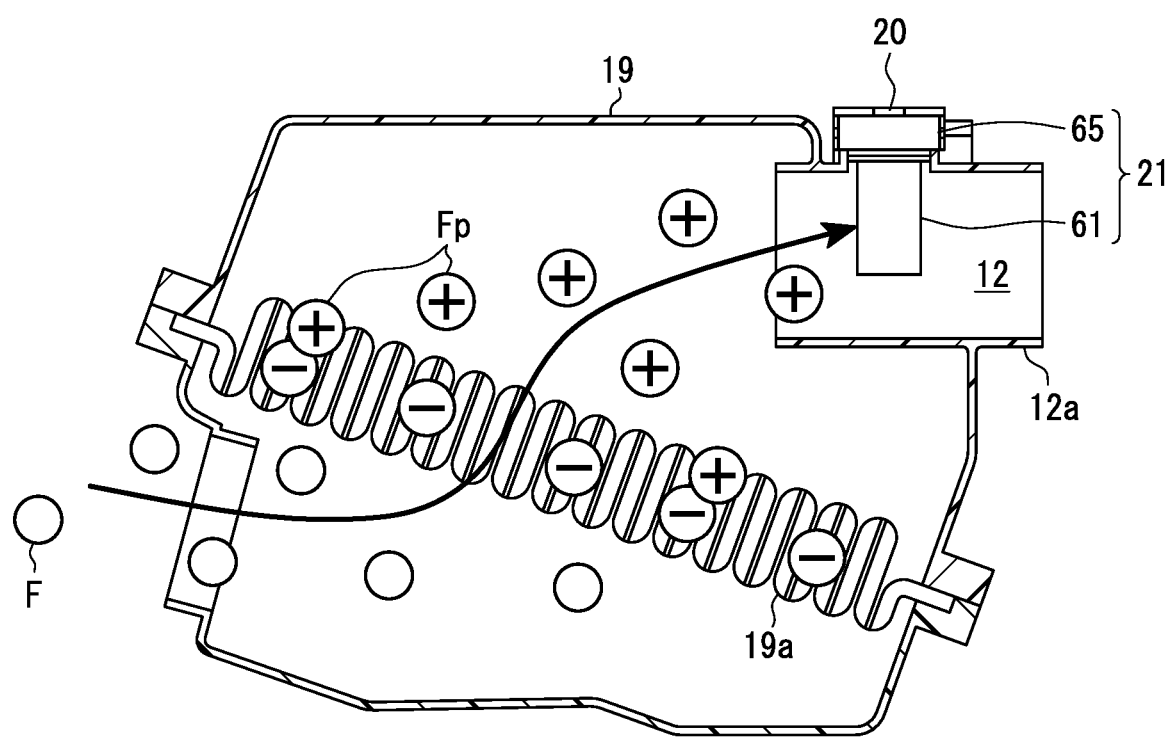
FIG. 8 is a diagram for explaining charging of foreign matter passing through an air cleaner.

As shown in FIG. 8, when the foreign matter F comes into contact with the air filter 19a while passing through the air cleaner 19 together with the intake air, the foreign matter F is more likely to be positively charged than the material of the air filter 19a in the charging column. Therefore, it becomes positively charged and becomes a positive foreign matter Fp. In this case, the air filter 19a is negatively charged. It is also assumed that foreign matter that is easily positively charged passes through the air cleaner 19 without being positively charged.

As shown in FIG. 5, the positive foreign matter Fp that has passed through the air cleaner 19 reaches the airflow meter 20 and approaches the outer surface or inner surface of the housing 21. In this case, the positive foreign material Fp is easily attracted to the negative electric charge 75 generated by the contact with the housing 21 or already existing, and thus easily adheres to the outer surface 62a and the inner surface 62b of the housing 21. In the airflow meter 20, when the negative charge 75 increases to some extent in the housing 21 due to the repeated charging of the housing 21 by the foreign matter, the negative charge 75 easily diffuses from the housing 21 to the flow rate detection unit 22 of the sensor SA 50. When the flow rate detection unit 22 is negatively charged by the negative charge 75 that has moved to the flow rate detection unit 22, the positive foreign matter Fp that has entered the measurement flow channel 32 together with the intake air is electrically attracted to the negative charge 75 in the flow rate detection unit 22. As a result, the positive foreign matter Fp easily adheres to the flow rate detection unit 22. As described above, when the foreign matter adheres to the flow rate detection unit 22, there is a possibility that the detection accuracy of the flow rate detection unit 22 will be reduced due to the presence of the foreign matter.

On the other hand, in the present embodiment, as described above, since the volume resistivity of each of the flow channel members 62 and 63 is a value included in the range of $1.0 \times 10^{11}$ ($1.0 \times 10$ to the 11th power) Ωcm to $1.0 \times 10^{14}$ ($1.0 \times 10$ to the 14th power) Ωcm, a dielectric breakdown due to the negative charge 75 is relatively easy to occur.

Figure 9:
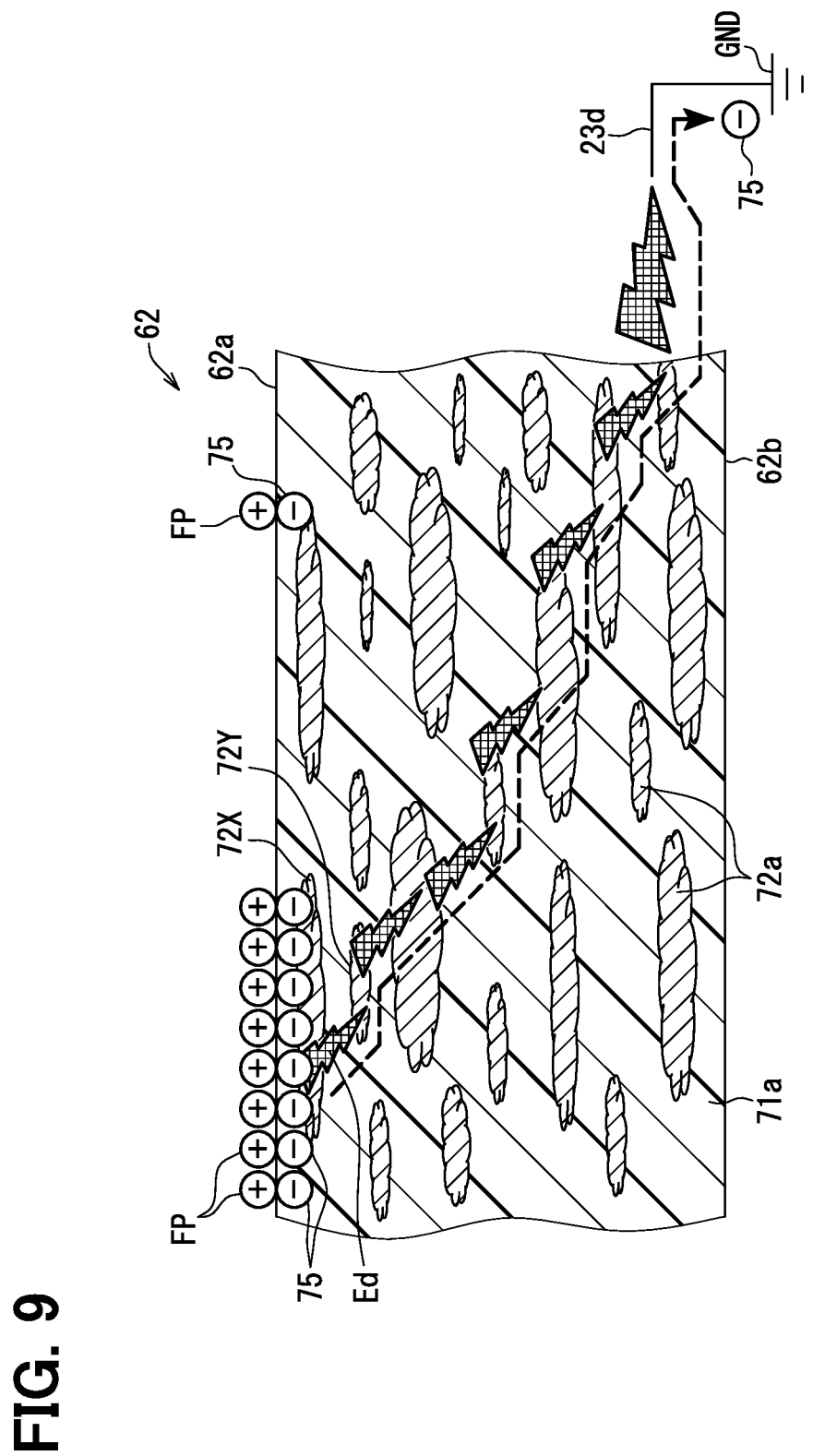
FIG. 9 is a diagram for explaining dielectric breakdown that occurs in the first flow channel member.

For example, as shown in FIG. 9, a plurality of negative charges 75 are collected in the conductive portion 72X near the outer surface 62a, and a plurality of positive foreign matters Fp are electrically attracted by the negative charges 75. As a result, it is assumed that the plurality of positive foreign matters Fp are adhered to the outer surface 62a of the first flow channel member 62. In this case, the first flow channel member 62 is in a negatively charged state due to static electricity, and the conductive portion 72X is included in the skin layer of the first flow channel member 62. In the first flow channel member 62, the larger the number of the negative charges 75 collected in the conductive portion 72X, the higher the potential of the conductive portion 72X becomes on the negative side. When the voltage due to this potential becomes high to some extent, the discharge Ed is generated between the conductive portion 72X and the conductive portion 72Y near the conductive portion 72X.

When the discharge Ed occurs between the conductive portions 72X and 72Y, the dielectric breakdown occurs in the portion between the conductive portions 72X and 72Y in the insulating portion 71a, and the negative charge 75 in the conductive portion 72X moves to the conductive portion 72Y. Since such discharge and dielectric breakdown occur at a plurality of positions in the path connecting the conductive portion 72X and the ground terminal 23d, the negative charge 75 accumulated in the conductive portion 72X is discharged to the ground GND through the plurality of conductive portions 72a and the ground terminal 23d. As described above, when the negative charges 75 that have electrically attracted the plurality of positive foreign matters Fp disappear from the conductive portion 72X, the positive foreign matters Fp easily separate from the outer surface 62a of the first flow channel member 62. Therefore, it is possible to suppress the negative charge 75 from being generated by the first flow channel member 62 being negatively charged again due to the influence of the positive foreign matter Fp in contact with the outer surface 62a.

A voltage of 0.1 kV to 10 kV is assumed as a voltage at which dielectric breakdown due to static electricity is likely to occur. The volume resistivity of the first flow channel member 62 where dielectric breakdown easily occurs varies depending on the voltage generated by static electricity. For example, the higher the volume resistivity, the higher the voltage at which electrostatic breakdown is likely to occur. Specifically, in the case of static electricity of 0.1 kV, when the volume resistivity is about $1.0 \times 10^{11}$ (1.0×10 to the 11th power) Ωcm, dielectric breakdown is relatively likely to occur, and in the case of static electricity of 1 kV, when the volume resistivity is $1.0 \times 10^{12}$ (1.0×10 to the 12th power) Ωcm, dielectric breakdown is relatively likely to occur. Further, in the case of static electricity of 10 kV, if the volume resistivity is about $1.0 \times 10^{13}$ (1.0×10 to the 13th power) Ωcm, dielectric breakdown is relatively likely to occur. Therefore, in the airflow meter 20 installed in the vehicle, a voltage value that is likely to be generated in the housing 21 due to static electricity is acquired by a test or the like, and it is preferable to set the volume resistivity of the housing 21 at the time of manufacturing the airflow meter 20 based on the acquired result.

In FIG. 9, the ground terminal 23d is arranged near the inner surface 62b in order to clarify the path through which the negative charge 75 passes, but as described above, the ground terminal 23d is actually arranged close to the outer surface 62a.

Also in the second flow channel member 63, when a plurality of negative charges 75 are electrically attracting the positive foreign matter Fp attached to the outer surface 63a, discharge and dielectric breakdown are likely to occur at a plurality of positions in the path connecting the negative charges 75 and the ground terminal 23d. In this case, because the ground terminal 23d is not connected to the second flow channel member 63, the negative charge 75 accumulated in the second flow channel member 63 is discharged to the ground GND through the first flow channel member 62.

Also in the outer layer 66 of the terminal accommodating portion 65, when a plurality of negative charges 75 are electrically attracting the positive foreign matter Fp attached to the exposed surface 65a, discharge and dielectric breakdown are likely to occur at a plurality of positions in the path connecting the negative charges 75 and the ground terminal 23d. However, in the terminal accommodating portion 65, since the conductive portion 72c is hardly included in the inner layer 67, discharge and dielectric breakdown are less likely to occur in the inner layer 67. Furthermore, since the ground terminal 23d may not be provided in the terminal accommodating portion 65, the negative charge 75 accumulated in the outer layer 66 of the terminal accommodating portion 65 is discharged to the ground GND through the first flow channel member 62 and the second flow channel member 63 without passing through the inner layer 67.

Figure 10:
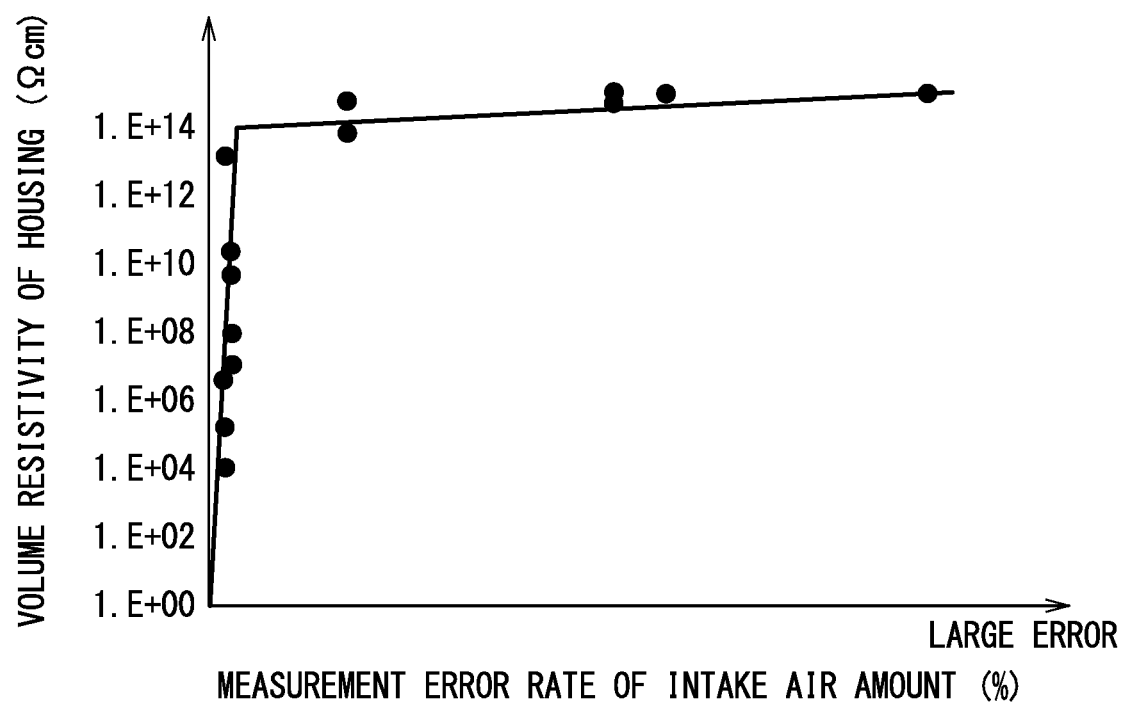
FIG. 10 is a diagram showing a relationship between a measurement error rate of the airflow meter and a volume resistivity of a housing.

Next, a relationship between a measurement accuracy of the airflow meter 20 and the volume resistivity of the housing 21 will be described. Here, as the measurement accuracy of the airflow meter 20, an error rate is used regarding the intake air amount in the intake passage 12. The error rate is calculated as a ratio of the magnitude of the error of the measured value of the airflow meter 20 to the true value of the intake air amount. As shown in FIG. 10, in the range where the volume resistivity of the housing 21 is $1.0 \times 10^{14}$ (1.0×10 to the 14th power) Ωcm or less, the error rate of the measured value is sufficiently small. On the other hand, in the range where the volume resistivity of the housing 21 is larger than $1.0 \times 10^{14}$ (1.0×10 to the 14th power) Ωcm, the error rate of the measured value is rapidly increasing. As described above, in the test for acquiring the relationship between the volume resistivity of the housing 21 and the error rate of the measurement value, test results have been obtained that the detection accuracy of the flow rate detection unit 22 is improved by setting the volume resistivity of the housing 21 to a value of $1.0 \times 10^{14}$ (1.0×10 to the 14th power) Ωcm or less.

Further, in the configuration in which the volume resistivity of the flow channel members 62 and 63, the terminal accommodating portion 65, the flow channel forming portion 61, and the housing 21 is smaller than $1.0 \times 10^{11}$ (1.0×10 to the 11th power) Ωcm, it is expected that discharge and dielectric breakdown will occur even if the static electricity energy accumulated in the housing 21 is relatively small. With this configuration, the number of discharges and dielectric breakdowns that occur in the insulating portions 71a to 71c tends to increase excessively, and there is a concern that deterioration of the insulating portions 71a to 71c easily progresses due to the dielectric breakdown. On the other hand, in the present embodiment, the volume resistivity of the housing 21 and the like is $1.0 \times 10^{11}$ (1.0×10 to the 11th power) Ωcm or more. Therefore, it is unlikely that an excessive amount of dielectric breakdown occurs due to the charging of the housing 21, and as a result, it is possible to suppress the deterioration of the insulating portions 71a to 71c due to the dielectric breakdown.

According to the present embodiment described above, the volume resistivity of the flow channel forming portion 61 is a value included in the range of $1.0 \times 10^{11}$ (1.0×10 to the 11th power) Ωcm to $1.0 \times 10^{14}$ (1.0×10 to the 14th power) Ωcm. In this configuration, discharge and dielectric breakdown are relatively likely to occur due to the electric energy of the negative charges 75 accumulated in the flow channel forming portion 61, and thus the negative charges 75 are easily discharged to the ground GND through the ground terminal 23d. In this case, even if the negative charges 75 accumulated in the flow channel forming portion 61 are diffused in the flow rate detection unit 22, the negative charges 75 accumulated in the flow rate detection unit 22 are also discharged to the ground GND through the flow channel forming portion 61. As described above, since the foreign matter is less likely to adhere to the flow rate detection unit 22 by eliminating the negatively charged state of the flow channel forming portion 61 and the flow rate detection unit 22, it is possible to prevent the detection accuracy of the flow rate detection unit 22 from decreasing due to the adhesion of foreign matter to the flow rate detection unit 22.

Further, since the detection accuracy of the flow rate detection unit 22 is improved, the measurement result which is the output of the airflow meter 20 input to the ECU 15 becomes stable. Therefore, in the configuration in which the ECU 15 controls the output of the internal combustion engine 11 using the output of the airflow meter 20 as in the present embodiment, the output of the internal combustion engine 11 can be stabilized and be improved by stabilizing the output of the airflow meter 20. Further, it is possible to prevent the housing 21 and the flow rate detection unit 22 from being soiled due to the adhesion of the positive foreign matter Fp to the housing 21 and the flow rate detection unit 22. In this case, it is possible to suppress the loss of the intake air flow in the intake passage 12 due to the foreign matter attached to the outer surface of the housing 21, so that the intake efficiency can be improved, and furthermore it is possible to eliminate the adverse effect on other products such as the throttle sensor 18a. Further, in this case, since the smooth flow of the intake air in the bypass flow channel 30 can be maintained due to the foreign matter attached to the inner surface of the housing 21, the output stability of the airflow meter 20 can be enhanced.

According to the present embodiment, the volume resistivity of the terminal accommodating portion 65 is a value included in the range of $1.0 \times 10^{11}$ ($1.0 \times 10$ to the 11th power) Ωcm to $1.0 \times 10^{14}$ ($1.0 \times 10$ to the 14th power) Ωcm. Therefore, even if the terminal accommodating portion 65 is negatively charged, the negative charge 75 can be discharged to the ground GND due to the dielectric breakdown as in the case where the flow channel forming portion 61 is negatively charged. Therefore, it is possible to eliminate the state where the terminal accommodating portion 65 and the flow rate detection unit 22 are negatively charged.

According to the present embodiment, the volume resistivity of the housing 21 is a value included in the range of $1.0 \times 10^{11}$ ($1.0 \times 10$ to the 11th power) Ωcm to $1.0 \times 10^{14}$ ($1.0 \times 10$ to the 14th power) Ωcm. Therefore, even if the housing 21 is negatively charged, the negative charge 75 can be discharged to the ground GND due to the dielectric breakdown as in the case where the flow channel forming portion 61 is negatively charged. Therefore, it is possible to eliminate the state where the housing 21 and the flow rate detection unit 22 are negatively charged.

According to the present embodiment, in the housing 21, the insulating portions 71a to 71c are mixed with the conductive portions 72a to 72c. In this configuration, when the negative charge 75 is accumulated near the outer surface of the housing 21, dielectric breakdown is performed from the portion where the negative charge 75 is accumulated to the nearby conductive portions 72a to 72c, so that the negative charge 75 can move toward the ground terminal 23d. In this way, in the insulating portions 71a to 71c, dielectric breakdown occurs at a plurality of places within a short distance of the part partitioned by the conductive portions 72a to 72c. Therefore, the negative charge 75 can reach the ground terminal 23d. Therefore, it is possible to realize a configuration in which the negative charge 75 accumulated in the housing 21 is easily discharged to the ground GND due to the dielectric breakdown.

According to the present embodiment, the conductive portions 72a to 72c are formed by compounding a plurality of types of carbon materials. Therefore, when the flow channel members 62, 63 and the terminal accommodating portion 65 are resin-molded using the molten resin, the conductive material in the molten resin is easily spread over the entire insulating material. In this case, even if the flow channel members 62, 63 and the terminal accommodating portion 65 have a complicated shape, the conductive portions 72a to 72c can be located near the surface such as the skin layer of the flow channel members 62, 63 and the terminal accommodating portion 65. Therefore, the plurality of negative charges 75 collected near the surface easily move to the nearby conductive portions 72a to 72c due to the dielectric breakdown. As described above, the negative charge 75 can be efficiently discharged to the ground GND by efficiently responding the complicated product shape of the housing 21.

According to the present embodiment, the insulating portions 71a to 71c are formed of a reversibly solidified thermoplastic resin. Therefore, when dielectric breakdown due to static electricity occurs in the flow channel members 62 and 63 and the terminal accommodating portion 65, even if the insulating portions 71a to 71c melt at the position where the dielectric breakdown occurs, it is considered that the melted portion solidifies again. In this case, it is assumed that the insulating portions 71a to 71c are unlikely to deteriorate due to the occurrence of dielectric breakdown. Therefore, it is possible to suppress the deterioration of the housing 21 due to the dielectric breakdown, while realizing the configuration in which the housing 21 and the flow rate detection unit 22 are less likely to be charged by causing the dielectric breakdown.

According to the present embodiment, in the terminal accommodating portion 65, the content ratio of the conductive portion 72c of the inner layer 67 accommodating the lead terminal 52 is lower than that of the outer layer 66. Therefore, when the terminal accommodating portion 65 is negatively charged, the negative charge 75 can be discharged to the ground GND by causing the dielectric breakdown in the outer layer 66. In addition, the inner layer 67 can ensure the insulation so that the leakage of the lead terminal 52 does not occur. For this reason, the detection accuracy of the flow rate detection unit 22 is prevented from being lowered by the static electricity by the outer layer 66, so that it is possible to accurately exchange signals between the lead terminal 52 and the external device such as the ECU 15.

In the terminal accommodating portion 65, the outer layer 66 and the inner layer 67 are integrally molded with a common molten resin. In this configuration, the different functions of electrically insulating the lead terminal 52 to enable electrical conduction and electrically conducting to prevent charging of the terminal accommodating portion 65 can be realized by one kind of molten resin without using plural kinds of molten resins. Therefore, it is possible to manufacture the terminal accommodating portion 65 excellent in structure and cost.

According to the present embodiment, the ground terminal 23d is exposed to the outside from the outer surface of the flow channel forming portion 61. With this configuration, when the flow channel forming portion 61 is negatively charged, the negative charge 75 can move near the outer surface of the flow channel forming portion 61 and reach the ground terminal 23d. In this case, in the flow channel forming portion 61, since the negative charge 75 can be discharged to the ground GND through both the internal path accompanied by the dielectric breakdown and the external path extending along the outer surface, it is possible to more reliably suppress the flow channel forming portion 61 from being negative charged.

According to the present embodiment, the volume resistivity of the flow channel forming portion 61 is a value indicating the resistance between the outer surfaces 62a and 63a and the inner surfaces 62b and 63b. Therefore, the volume resistivity of the flow channel forming portion 61 is set to $1.0 \times 10^{11}$ ($1.0 \times 10$ to the 11th power) Ωcm to $1.0 \times 10^{14}$ ($1.0 \times 10$ to the 14th power) Ωcm. Therefore, it is possible to control the easiness of occurrence of the phenomenon that the negative charge 75 passes through the inside of the flow channel forming portion 61 and reaches the ground terminal 23d due to the dielectric breakdown. Therefore, even if the ground terminal 23d is connected to only one of the outer surfaces 62a and 63a and the inner surfaces 62b and 63b in the flow channel forming portion 61, the negative charge 75 accumulated on the other side can be reached to the ground terminal 23d due to the occurrence of dielectric breakdown.

(Second Embodiment)

In the first embodiment, the inner layer 67 and the outer layer 66 are formed due to the uneven distribution of the insulating portion 71c in the terminal accommodating portion 65. On the other hand, in the second embodiment, the insulating portion 71c is diffused throughout the terminal accommodating portion 65, and the inner layer 67 and the outer layer 66 are not formed. In the present embodiment, differences from the first embodiment will be mainly described.

Figure 11:
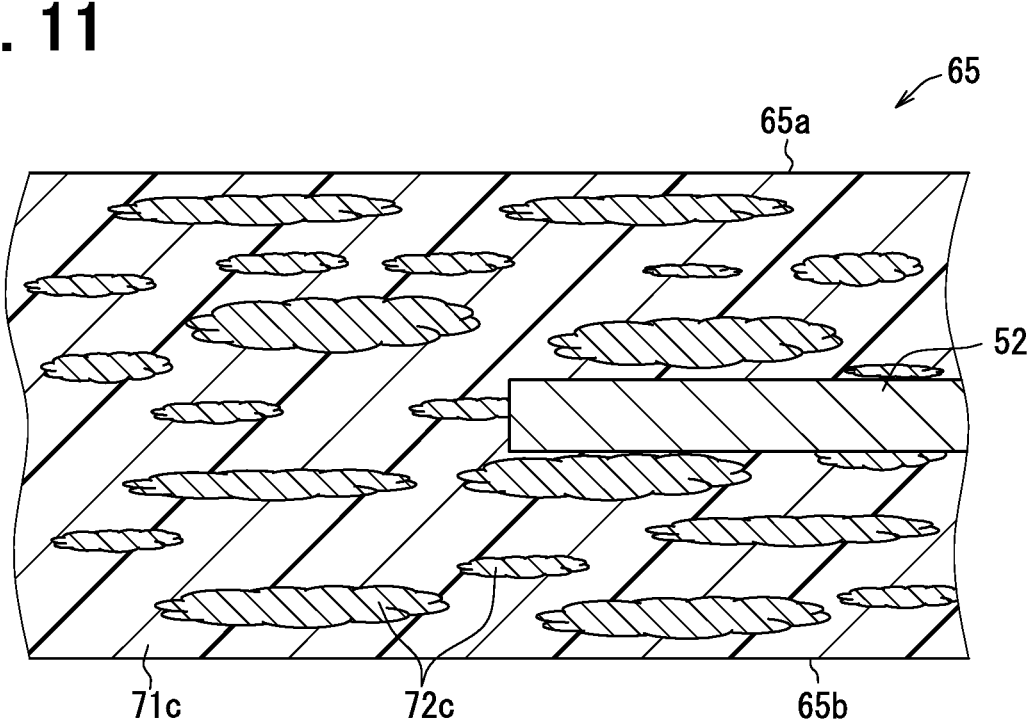
FIG. 11 is a diagram for explaining an arrangement of insulating portions and conductive portions in a terminal accommodating portion according to a second embodiment.

As shown in FIG. 11, in the terminal accommodating portion 65, as in the case of the flow channel members 62 and 63, the conductive portion 72c is in a state of being diffused over the entire insulating portion 71c. In this configuration, the volume resistivity of the terminal accommodating portion 65 is a value included in the range of $1.0 \times 10^{11}$ ($1.0 \times 10$ to the 11th power) Ωcm to $1.0 \times 10^{14}$ ($1.0 \times 10$ to the 14th power) Ωcm. In this case, in the terminal accommodating portion 65, although the conductive portion 72c exists around the lead terminal 52, the insulation breakdown of the insulating portion 71c is less likely to occur at a voltage applied to the lead terminal 52 so that leakage at the lead terminal 52 can be suppressed.

In the present embodiment, the injection speed of the molten resin from the injection molding machine to the mold device is slowed down to the same level as the injection speed of the molten resin when the flow channel members 62 and 63 are resin-molded, when molding the terminal accommodating portion 65 with resin. In this case, the state in which the conductive material is mixed in the entire molten resin injected into the mold device is easily maintained, so that the conductive portion 72c easily diffuses in the entire insulating portion 71c.

(Third Embodiment)

Figure 12:
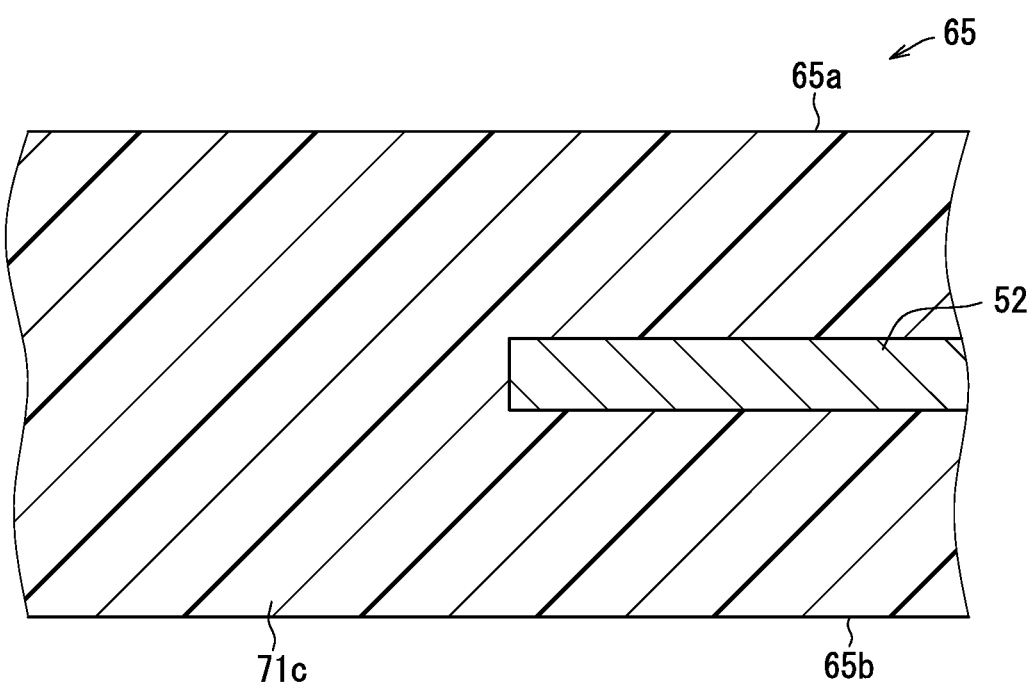
FIG. 12 is a diagram for explaining an insulating portion in a terminal accommodating portion according to a third embodiment.

In the first embodiment, the terminal accommodating portion 65 includes the conductive portion 72c, but in the third embodiment, the terminal accommodating portion 65 does not include the conductive portion 72c, as shown in FIG. 12. In the present embodiment, differences from the first embodiment will be mainly described.

Since the terminal accommodating portion 65 does not include the conductive portion 72a, the volume resistivity of the terminal accommodating portion 65 is larger than $1.0 \times 10^{14}$ ($1.0 \times 10$ to the 14th power) Ωcm, like the volume resistivity of the insulating portion 71c. In this configuration, since the insulation of the lead terminal 52 by the terminal accommodating portion 65 is enhanced, the accuracy of signal exchange between the lead terminal 52 and the ECU 15 can be further enhanced.

Although a plurality of embodiments according to the present disclosure have been described above, the present disclosure is not construed as being limited to the above-mentioned embodiments, and can be applied to various embodiments and combinations within a scope not departing from the spirit of the present disclosure. Modifications of the above embodiments will be described.

As a first modification, the flow channel members 62 and 63 may include an outer layer in which the conductive portions 72a and 72b are mixed in the insulating portions 71a and 71b, and an inner layer in which the content ratio of the conductive portions 72a and 72b to the insulating portions 71a and 71b is lower than the outer layer. Even in this case, the volume resistivity of the flow channel members 62 and 63 and the flow channel forming portion 61, and the housing 21 is a value included in the range of $1.0 \times 10^{11}$ ($1.0 \times 10$ to the 11th power) Ωcm to $1.0 \times 10^{14}$ ($1.0 \times 10$ to the 14th power) Ωcm.

As a second modification, in the terminal accommodating portion 65, the outer layer 66 may be a layer thicker than the skin layer. In this case, the outer layer 66 is formed by the skin layer and a part of the core layer. That is, also in the core layer, there is a portion where a large amount of the conductive portion 72c is included in a part on the peripheral edge side, and this portion forms the outer layer 66, while the remaining portion forms the inner layer 67.

As a third modification, the flow channel forming portion 61 may be formed by one member instead of assembling a plurality of members such as the flow channel members 62 and 63 to manufacture the flow channel forming portion 61. For example, the flow channel forming portion 61 is integrally resin-molded. Even in this configuration, since the volume resistivity of the flow channel forming portion 61 is a value included in the range of $1.0 \times 10^{11}$ ($1.0 \times 10$ to the 11th power) Ωcm to $1.0 \times 10^{14}$ ($1.0 \times 10$ to the 14th power) Ωcm, the negative charge 75 accumulated in the flow channel forming portion 61 is easily discharged to the ground GND due to the dielectric breakdown. Further, in the flow channel forming portion 61, the conductive portion is mixed with the insulating portion, so that dielectric breakdown in the insulating portion is likely to occur.

As a fourth modified example, instead of assembling a plurality of members such as the flow channel members 62 and 63 and the terminal accommodating portion 65 to manufacture the housing 21, the housing 21 may be formed by one member. For example, the housing 21 is integrally resin-molded. Even in this configuration, since the volume resistivity of the housing 21 a value included in the range of $1.0 \times 10^{11}$ ($1.0 \times 10$ to the 11th power) Ωcm to $1.0 \times 10^{14}$ ($1.0 \times 10$ to the 14th power) Ωcm, the negative charge 75 accumulated in the housing 21 is easily discharged to the ground GND due to the dielectric breakdown. Further, in the housing 21, the conductive portion is mixed with the insulating portion, so that dielectric breakdown is likely to occur in the insulating portion.

As a fifth modification, the flow channel members 62 and 63 and the terminal accommodating portion 65 does not include the conductive portions 72a to 72c in the insulating portions 71a to 71c. The volume resistivity of the insulating portions 71a to 71c is a value included in the range of $1.0 \times 10^{11}$ ($1.0 \times 10$ to the 11th power) Ωcm to $1.0 \times 10^{14}$ ($1.0 \times 10$ to the 14th power) Ωcm. In this configuration, the volume resistivity of the insulating material forming the insulating portions 71a to 71c is a value included in the range of $1.0 \times 10^{11}$ ($1.0 \times 10$ to the 11th power) Ωcm to $1.0 \times 10^{14}$ ($1.0 \times 10$ to the 14th power) Ωcm.

As a sixth modification, a thermosetting resin or the like may be used as the resin material forming the insulating portions 71a to 71c instead of the thermoplastic resin. Further, as the insulating material forming the insulating portions 71a to 71c, a rubber material or the like may be used instead of the resin material.

As a seventh modification, as the carbon material forming the conductive portions 72a to 72c, only one kind of carbon powder, carbon fiber, nanocarbon, graphene, and carbon microparticle may be used. Further, as the conductive material forming the conductive portions 72a to 72c, a metal material such as aluminum may be used instead of the carbon material.

As an eighth modification, the volume resistivity of each member such as the flow channel members 62 and 63, the terminal accommodating portion 65, the flow channel forming portion 61, and the housing 21 is calculated by using a surface resistivity which is the resistance per unit area of these members.

As a ninth modification, in the members such as the flow channel members 62 and 63, the terminal accommodating portion 65, the flow channel forming portion 61, and the housing 21, the resistance value of the portion having the largest resistance value may be is a value included in the range of $1.0 \times 10^{11}$ ($1.0 \times 10$ to the 11th power) Ωcm to $1.0 \times 10^{14}$ ($1.0 \times 10$ to the 14th power) Ωcm. For example, in the housing 21, the resistance value between the two points most distant from each other is set to a value included in the range of $1.0 \times 10^{11}$ ($1.0 \times 10$ to the 11th power) Ωcm to $1.0 \times 10^{14}$ ($1.0 \times 10$ to the 14th power) Ωcm. Also with this configuration, when the housing 21 is charged by static electricity, it is possible to cause dielectric breakdown due to discharge inside the housing 21 and discharge the negative charge 75 to the ground GND.

As a tenth modification, in the measurement flow channel 32 through which a fluid such as an intake air flows, a temperature sensor for detecting a temperature of the fluid, a humidity sensor for detecting a humidity of the fluid, a pressure sensor for detecting a pressure, and the like may be provided as the physical quantity detection unit such as the flow rate detection unit 22.

As an eleventh modification, the bypass flow channel 30 may include only the measurement flow channel 32 of the passage flow channel 31 and the measurement flow channel 32. For example, the measurement inlet 35 may be provided on the outer surface of the housing 21 instead of the inflow port 33.

As a twelve modification, a plurality of ground portions such as the ground terminal 23d attached to the housing 21 may be provided. For example, the flow channel members 62, 63 and the terminal accommodating portion 65 each have one ground portion attached thereto. Further, a plurality of ground portions may be attached to at least one of the first flow channel member 62, the second flow channel member 63, and the terminal accommodating portion 65. For example, in the first flow channel member 62, the ground portion is individually attached to each of the outer surface 62a and the inner surface 62b.

The present disclosure has been described based on examples, but it is understood that the present disclosure is not limited to the examples or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

In an assumable example, a physical quantity measurement device measures a flow rate of an intake air taken into an internal combustion engine. The physical quantity measurement device has a curved passage through which the fluid passes, and a flow rate measurement element provided in the curved passage. When foreign matter such as dust enters the curved passage and collides with the flow rate measurement element together with the fluid, the flow rate measurement element may be damaged depending on a size and a speed of the foreign matter. As a countermeasure against the above drawback, an inner wall surface of the curved passage has a rough surface, as a result of which the foreign matter that has entered the curved passage collides with the rough surface and changes a traveling direction, thereby decreasing the speed, which causes a reduction in a kinetic energy. As described above, even if the foreign matter collides with the flow rate measuring element, the damage of the flow rate measurement element is inhibited.

However, when the foreign matter enters the curved passage, if an electric attraction force is generated between the foreign matter and a physical quantity detection unit such as the flow rate measurement element, the foreign matter tends to adhere to the physical quantity detection unit, as a result of which, there is a concern that a detection accuracy of the physical quantity may be lowered. For that reason, if the speed of the foreign matter is reduced in the curved passage, it is considered that the foreign matter is more likely to adhere to the physical quantity detection unit even if the damage of the physical quantity detection unit due to the collision of the foreign matter can be inhibited.

In order to achieve the above object, a first aspect of the present disclosure is a physical quantity measurement device that measures a physical quantity of a fluid. The physical quantity measurement device includes a bypass flow channel through which a fluid flows, a physical quantity detection unit for detecting a physical quantity of the fluid in the bypass flow channel, a detection unit having a detection terminal electrically connected to the physical quantity detection unit, a housing having a flow channel forming portion having an insulating property and forming a bypass flow channel and a terminal accommodating portion having an insulating property and accommodating a detection terminal, and a ground portion connecting the flow channel forming portion to a ground. A volume resistivity of the flow channel forming portion is included in the range of $1.0 \times 10^{11}$ ($1.0 \times 10$ to the 11th power) Ωcm to $1.0 \times 10^{14}$ ($1.0 \times 10$ to the 14th power) Ωcm.

When the fluid flowing around the physical quantity measurement device contains foreign matter, such as sand, which easily becomes positively charged, the foreign matter may be easily positively charged by approaching or contacting the flow channel forming portion of the physical quantity measurement device. Therefore, it is considered that the flow channel forming portion is easily charged negatively. In this case, foreign matter is likely to adhere to the flow channel forming portion. Further, since the negative charges charged in the flow channel forming portion move to the physical quantity detection unit, the physical quantity detection unit also tends to be negatively charged. When foreign matter such as sand that has already been positively charged enters the bypass flow channel and approaches or contacts the physical quantity detection unit, an electrical attractive force is generated between the foreign matter and the physical quantity detection unit, and the foreign matter becomes easy to adhere to the physical quantity detection unit.

On the other hand, according to the first aspect, the volume resistivity of the flow channel forming portion is included in the range of $1.0 \times 10^{11}$ ($1.0 \times 10$ to the 11th power) Ωcm to $1.0 \times 10^{14}$ ($1.0 \times 10$ to the 14th power) Ωcm, and is smaller than $1.0 \times 10^{15}$ to $10^{16}$ ($1.0 \times 10$ to the 15th power to the 16th power) Ωcm, which is the volume resistivity of a general insulating material. With this configuration, when the flow channel forming portion is negatively charged due to the approach or contact of foreign matter to the flow channel forming portion, the voltage generated by the negative charge causes dielectric breakdown in the flow channel forming portion to the ground through the ground portion. In this case, the negative charges that have been charged in the physical quantity detection unit are also discharged to the ground via the flow channel formation portion and the ground portion, so that the charges in both the flow channel formation unit and the physical quantity detection unit are eliminated. For this reason, it becomes difficult for foreign matter to adhere to the flow channel forming portion and the physical quantity detection unit, and as a result, it is possible to prevent the detection accuracy of the physical quantity detection unit from being lowered due to the foreign matter adhering to the physical quantity detection unit.

A second aspect of the present disclosure is a physical quantity measurement device that measures a physical quantity of a fluid, including a housing that forms a bypass flow channel through which the fluid flows, a physical quantity detection unit that detects the physical quantity of the fluid in the bypass flow channel, and a ground portion where the housing is grounded. A volume resistivity of the housing is included in the range of $1.0\times10^{11}$ (1.0×10 to the 11th power) Ωcm to $1.0\times10^{14}$ (1.0×10 to the 14th power) Ωcm.

According to the second aspect, since the volume resistivity of the housing forming the bypass flow channel is included in the range of $1.0\times10^{11}$ (1.0×10 to the 11th power) Ωcm to $1.0\times10^{14}$ (1.0×10 to the 14th power) Ωcm, the second aspect has the same effect as in the first aspect.

What is claimed is:

1. A physical quantity measurement device for measuring a physical quantity of a fluid, the physical quantity measurement device comprising:
   a bypass flow channel through which the fluid flows;
   a detection unit including a physical quantity detection unit configured to detect a physical quantity of the fluid in the bypass flow path, and a detection terminal electrically connected to the physical quantity detection unit;
   a housing including a flow channel forming portion having an insulating property and forming a bypass flow channel, and a terminal accommodating portion having an insulating property and accommodating the detection terminal; and
   a ground portion connecting the flow channel forming portion to a ground,
   wherein
   a volume resistivity of the flow channel forming portion is included in a range of $1.0\times10^{11}$ (1.0×10 to the 11th power) Ωcm to $1.0\times10^{14}$ (1.0×10 to the 14th power) Ωcm.

2. The physical quantity measurement device according to claim 1, wherein
   the flow channel forming portion includes
      an insulating portion configured to impart insulating properties to the flow channel forming portion; and
      a conductive portion provided in a mixed state with the insulating portion and having conductivity so that the volume resistivity of the flow channel forming portion is smaller than that of the insulating portion.

3. The physical quantity measurement device according to claim 2, wherein
   the conductive portion includes at least one of carbon powder, carbon fiber, nanocarbon, graphene, and carbon microparticles.

4. The physical quantity measurement device according to claim 2, wherein
   the insulating portion is made of thermoplastic resin.

5. The physical quantity measurement device according to claim 1, wherein
   the volume resistivity of the terminal accommodating portion is in the range of $1.0\times10^{11}$ (1.0×10 to the 11th power) Ωcm to $1.0\times10^{14}$ (1.0×10 to the 14th power) Ωcm.

6. The physical quantity measurement device according to claim 1, wherein
   the terminal accommodating portion includes
      an insulating portion configured to impart insulating properties to the terminal accommodating portion, and
      a conductive portion which is provided in a mixed state in the insulating portion and has conductivity so that the volume resistivity of the terminal accommodating portion is smaller than the volume resistivity of the insulating portion.

7. The physical quantity measurement device according to claim 6, wherein
   the terminal accommodating portion includes
      an outer layer forming an outer surface of the terminal accommodating portion,
      an inner layer in which a content ratio of the conductive portion to the insulating portion is lower than that of the outer layer, and being provided inside the outer layer,
   the detection terminal is housed in the inner layer.

8. The physical quantity measurement device according to claim 1, wherein
   the ground portion is exposed to the outside from the outer surface of the flow channel forming portion.

9. The physical quantity measurement device according to claim 1, wherein
   the volume resistivity of the flow channel forming portion is a value indicating the resistance between the outer surface and the inner surface of the flow channel forming portion.

10. A physical quantity measurement device for measuring a physical quantity of a fluid, the physical quantity measurement device comprising:
    a housing forming a bypass flow channel through which the fluid flows;
    a physical quantity detection unit that detects a physical quantity of the fluid in the bypass flow channel; and
    a ground portion that grounds the housing to a ground,
    wherein
    the volume resistivity of the housing is in the range of $1.0\times10^{11}$ (1.0×10 to the 11th power) Ωcm to $1.0\times10^{14}$ (1.0×10 to the 14th power) Ωcm.

* * * * *